(12) United States Patent
Wu et al.

(10) Patent No.: US 9,760,372 B2
(45) Date of Patent: Sep. 12, 2017

(54) PARALLEL PROCESSING IN PLURAL PROCESSORS WITH RESULT REGISTER EACH PERFORMING ASSOCIATIVE OPERATION ON RESPECTIVE COLUMN DATA

(75) Inventors: Ren Wu, San Jose, CA (US); Bin Zhang, Fremont, CA (US); Meichun Hsu, Los Altos Hills, CA (US); Qiming Chen, Cupertino, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1485 days.

(21) Appl. No.: 13/224,090

(22) Filed: Sep. 1, 2011

(65) Prior Publication Data
US 2013/0061023 A1    Mar. 7, 2013

(51) Int. Cl.
*G06F 9/30* (2006.01)
*G06F 9/50* (2006.01)

(52) U.S. Cl.
CPC ........ *G06F 9/30036* (2013.01); *G06F 9/3001* (2013.01); *G06F 9/5066* (2013.01)

(58) Field of Classification Search
None
See application file for complete search history.

(56) References Cited

U.S. PATENT DOCUMENTS

| | | | | |
|---|---|---|---|---|
| 4,633,389 A | * | 12/1986 | Tanaka et al. | 712/4 |
| 5,887,183 A | * | 3/1999 | Agarwal et al. | 712/2 |
| 6,507,903 B1 | | 1/2003 | Beatty et al. | |
| 6,938,147 B1 | | 8/2005 | Joy et al. | |
| 7,315,934 B2 | * | 1/2008 | Morishita et al. | 712/11 |
| 2003/0088756 A1 | | 5/2003 | Vishkin | |
| 2009/0024586 A1 | | 1/2009 | Zhou | |
| 2010/0275189 A1 | | 10/2010 | Cooke et al. | |
| 2010/0275209 A1 | | 10/2010 | Detlefs | |
| 2012/0311302 A1 | * | 12/2012 | Yang et al. | 712/200 |

* cited by examiner

*Primary Examiner* — Eric Coleman
(74) *Attorney, Agent, or Firm* — Fabian VanCott

(57) ABSTRACT

A method for combining data values through associative operations. The method includes, with a processor, arranging any number of data values into a plurality of columns according to natural parallelism of the associative operations and reading each column to a register of an individual processor. The processors are directed to combine the data values in the columns in parallel using a first associative operation. The results of the first associative operation for each column are stored in a register of each processor.

19 Claims, 8 Drawing Sheets

PARALLEL PROCESSING IN PLURAL PROCESSORS WITH RESULT REGISTER EACH PERFORMING ASSOCIATIVE OPERATION ON RESPECTIVE COLUMN DATA

BACKGROUND

The recent trend towards multi-core processors and greater processor capability has increased the demand for more efficient information processing. Multi-core processors come in many forms, from the dual-core processors found in personal computing devices to the multiple thousand core processors found in research institutions.

In many instances the information to be processed is organized in a multi-dimensional matrix array. Often the desired output requires some combination of the elements in the array. Examples of these operations include, but are not limited to, sorting, parsing, combinatory reduction, and region labeling. These types of operations are fundamental primitives for implementing a wide range of algorithms and software on modern GPU's.

When the matrix operations are executed using multi-core processors, desired outputs may be returned more quickly because the processors can work in parallel fashion. This parallel process can be enhanced by maximizing the cooperation of the multiple processors.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
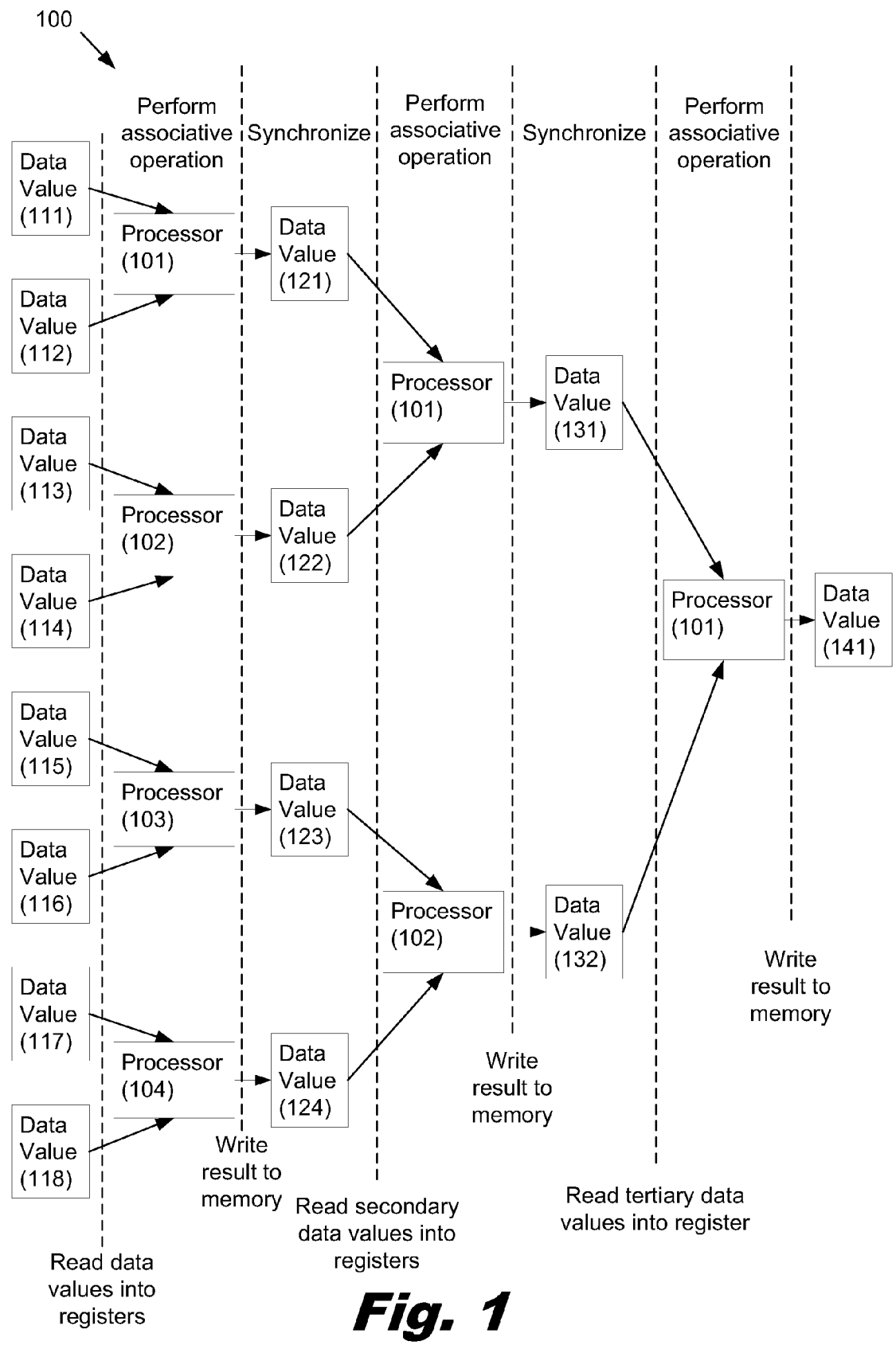
FIG. 1 is a diagram showing an illustrative system of parallel reduction, according to one example of principles described herein.

Efficient data processing is becoming increasingly more desirable as the size and demands presented by electronic databases continue to grow. More efficient data processes provide more readily available information, whether that information is presented to a user or utilized by another program to execute a predetermined process. As noted above, computing devices with multi-core processors can be used to increase the speed of data processing. These processors may work simultaneously to process data more quickly.

Nevertheless, there are still complications that could be addressed to increase the efficiency of these multi-core processors. For example, when multiple processors work simultaneously, it is a common occurrence to write intermediate results to a memory location on the computing system. As the number of intermediate actions increase, so does the time required to complete the process. These intermediate actions therefore consume valuable processor time and reduce the efficiency of the multi-core processing system. The processing actions of reading from a computer's memory and syncing the multiple processors present similar process-inhibiting obstacles. Additionally, as algorithms are written to process complex databases, they often are written inefficiently and require more processor-time to execute.

In light of these and other issues, the present specification discloses principles that enhance multi-core processor efficiency in executing associative operations by minimizing the reading, writing, and synchronization steps. According to certain examples, the method includes preparing a data matrix that takes advantage of the natural parallelism of the associative operations, assigning separate processors to manipulate certain subsets of data within the matrix, reducing each of the columns of data values to a result element, and temporarily storing the result elements in a system register, where they will remain until combined with other result elements from the matrix.

The principle of assigning one designated processor within a multi processor computing device to perform an operation on a specific column allows each of the processors to be utilized more effectively. The processors, working independently from one another, require no synchronization with other processors. Additionally, by storing the intermediate results in the register, valuable processing time is conserved as the results are not written to, read from, or synchronized with the memory on the computing device. Further, natural parallelism in the data matrix facilitates a coalesced memory access that maximizes the use of memory bandwidth.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Throughout this specification and in the appended claims, the term "associative operation(s)" refers to mathematical processes imposed on a data set, where the order in which the operations are performed does not alter the result. Examples include, but are not limited to addition, multiplication, matrix multiplication, and finding the greatest common divisor and least common multiple.

In the specification and in the appended claims, the term "register" refers to storage available on the processor that can be accessed more quickly than conventional memory. Typically, the register is not considered part of the memory for the computing device per se, but is viewed as an integral part of the processor. Additionally, throughout this specification and in the appended claims, the term "natural parallelism" refers to associative operations which simultaneously perform identical operations on different data subsets in a data matrix. Data which is organized according to "natural parallelism" has been arranged in a matrix such that the data subsets cohesive. The term "coalesced memory access" refers access to adjacent memory addresses by a group of processors. This is facilitated by arranging data subsets according to the natural parallelism of the associative operations.

Lastly, the term "prefix scan" refers to sequentially combining individual data values in a data subset using an associative operation and replacing the particular data values in the data subset with the sequentially combined data values up to the particular data value. A mathematical expression for the prefix sum may be generalized as follows:

Input: an array x containing the n values $\{x_0, \ldots, x_{n-1}\}$
Output: the same array with $\{x_0, \ldots, x_{n-1}\}$ is replaced by $$\{x_0, x_0+x_1, x_0+x_1+x_2 \ldots, \Sigma_{i=0}^{n-1} x_i\} \qquad \text{Eq. 1}$$

Referring now to the figures, FIG. 1 is a diagram showing an illustrative system (100) and process for parallel reduction of data values. The system (100) may include any number of primary data values (111, 112, 113, 114, 115, 116, 117, 118) and a number of processors (101, 102, 103, 104). The system (100) includes executable code to generate a final data value (141) from the primary data values.

The primary data values (111, 112, 113, 114, 115, 116, 117, 118) are read from memory into registers in the individual processors (101, 102, 103, 104). For example, a first processor (101) reads the first two values (111, 112) into its register. Similarly, the other processors (102, 103, 104) access the memory and read values into their registers. The processors (101, 102, 103, 104) then perform the associative operation to produce the secondary data values (121, 122, 123, 124). These secondary data values are then written into memory.

Before the next step in the process can be performed, the system (100) is synchronized to insure that all processors (101, 102, 103, 104) have completed their operation and the secondary data values (121, 122, 123, 124) have been written into the system memory. The secondary data values (121, 122, 123, 124) are then retrieved from the system memory by the appropriate subset of the processors (101, 102) and stored in the processors' registry and the appropriate associative operation is performed to produce tertiary data values (131, 132). The other processors (103, 104) are inactive during this time. The tertiary data values (131, 132) are then written into the system memory.

The system is again synchronized to ensure that all the active processors (101, 102) have completed their operation and the tertiary data values (131, 132) have been successfully written to the system memory. After synchronization, the tertiary data values (131, 132) are read from memory and into the register of the processor (101). The appropriate operation is performed to produce the final data value (141) which is written to the system memory. During the last portion of the process, only one processor (101) is active and the rest are idle (102, 103, 104).

While FIG. 1 depicts four processors (101, 102, 103, 104) and eight initial data values (111, 112, 113, 114, 115, 116, 117, 118), the system (100) may include any number of processors and any number of data values. The associative operations could be a wide range of matrix or vector based operations.

This illustrative system (100) and process demonstrates the inefficiencies of typical multi-processor matrix operations. A large portion of the processors may be inactive after the initial operation. This is inefficient because computational power which could be utilized to increase the speed of the operation is idle. Additionally, the process includes multiple read/write/synchronize steps which substantially increase the time to reach the final data value (141).

Figure 2:
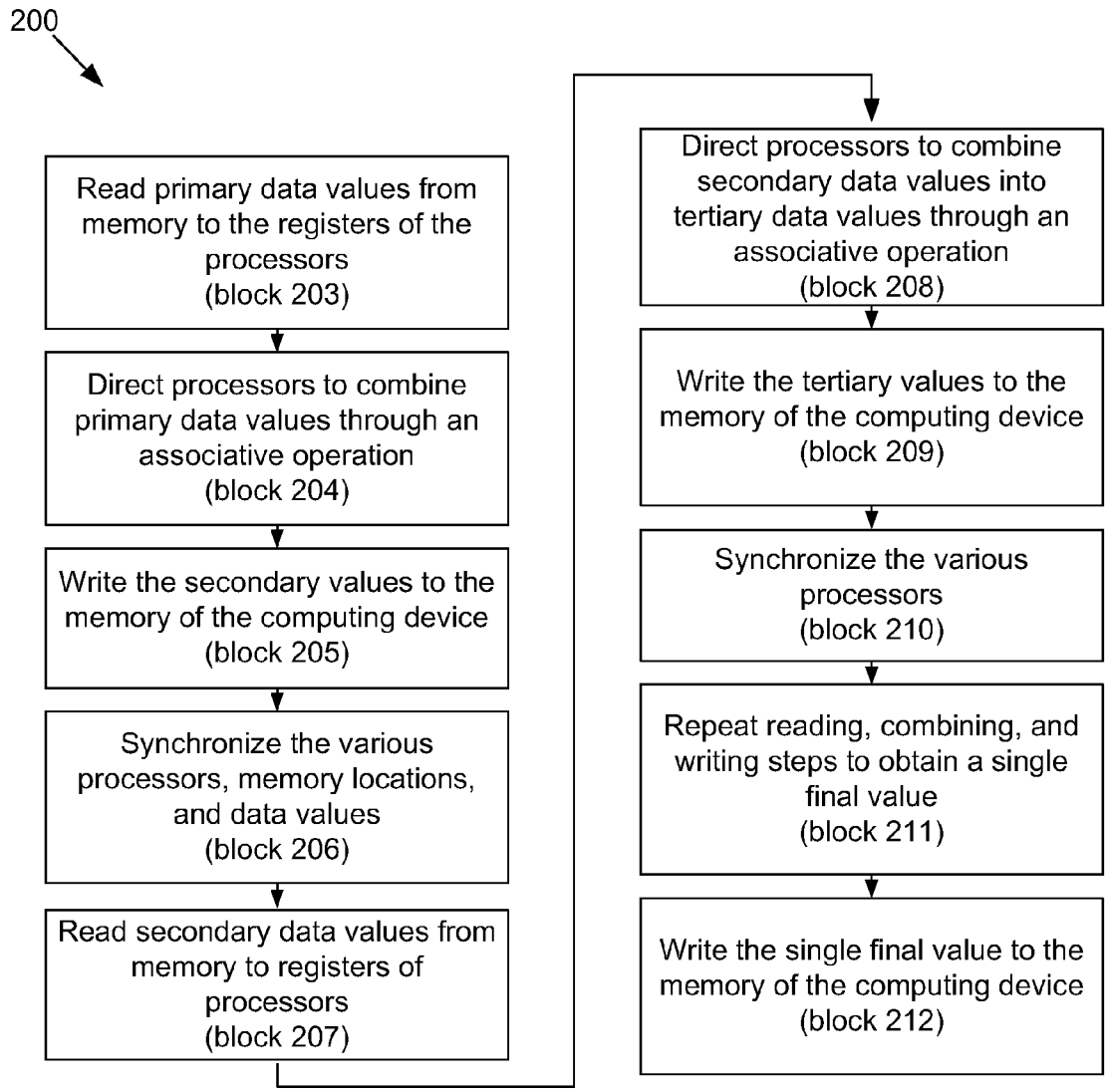
FIG. 2 is a flowchart showing an illustrative method of parallel reduction, according to one example of principles described herein.

FIG. 2 is a flowchart that further describes the method illustrated in FIG. 1 for parallel reduction of data values. The method (200) includes reading the primary data values from the memory of the computing device into registers corresponding to the individual processors (block 203), using one read request per processor. The processor then executes instructions to combine corresponding primary data values into secondary data values using an associative operation (block 204). The secondary values are written to the memory of the computing device (block 205).

The operations of the processors, memory locations, and data values are synchronized (block 206). The synchronization is done by waiting until all operations and writing to the secondary values to memory is completed by all of the processors. At this point both the number of data values in the data set and the number of active processors operating on the data values have been reduced by approximately one half. After primary data has been processed, secondary data values are read from the memory of the computing device into registers corresponding to the individual processors (block 207), using one read request per processor. The processors execute code to combine secondary data values into tertiary data values using the associative operation (block 208). These tertiary values are written to the memory of the computing device (block 209). The processors are again synchronized (block 210) by waiting until all operations and writing to memory is completed by all processors.

At the end of this stage, the number of the tertiary data values is approximately half of the number of secondary data values. This further reduces the number of active processors. The reading, combining, and writing steps of the method (200) may then be repeated in iterative fashion until a single final value is obtained (block 211). The method (200) may then include writing this final value to the memory of the computing device (block 212). An example of a computer algorithm to accomplish parallel reduction may be illustrated as follows:

```
for d = 0 to log₂ n - 1 do
    for all k = 0 to n - 1 by 2^(d + 1) in parallel do
        x[k + 2^(d + 1) - 1] = x[k + 2^d - 1] + x[k + 2^d + 1 - 1].
```

As discussed above, the system and process illustrated in FIGS. 1 and 2 demonstrates the inefficiencies of typical multi-processor matrix operations. A large portion of the processors may be inactive after the initial operation and the process includes multiple read/write/synchronize steps which substantially increase the time to reach the final data value. The specification describes a number of principles below which remedy these and other shortcomings of typical multi-processor matrix operations.

Figure 3:
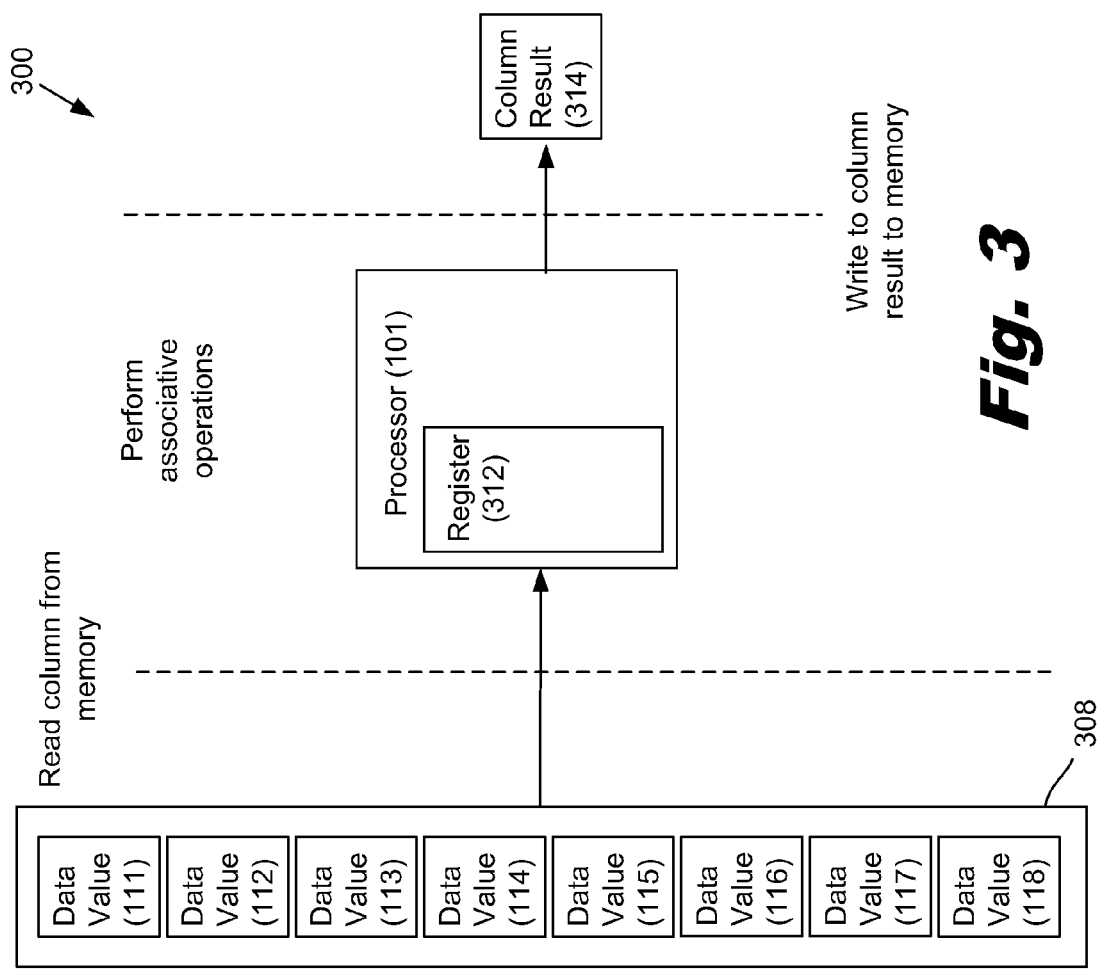
FIG. 3 is a diagram showing an illustrative system of multiple parallel reduction, according to one example of principles described herein.

FIG. 3 is a diagram showing an illustrative system (300) that uses a single processor (101) to perform an associative operation on a data column (308). The system may include any number of primary data values (111, 112, 113, 114, 115, 116, 117, 118) of a data subset (308). The data subset (308) may be organized in any of a wide range of data structures, sizes, or formats. In this example, the data subset (308) is organized as column.

In this example, only one register (312) is needed. The register (312) is used to store partial results. For example, for an addition operator, the register (312) is used to keep a running partial sum to which the additional data elements are added. The processor (101) performs the desired associative operations on the column of data (308) using the register for temporary storage (312) and writes a column result (314) to memory. The column result (314) may be a final desired result or an intermediate result which is used in a subsequent operation.

The system and process described in FIG. 3 has a number of advantages. Because the intermediate results for the entire column (308) can be stored in the register (312), there is no need for intermediate reading and writing actions to produce the column result (314). Further, because all the operations are performed by a single processor (101), there is no need for synchronization between processors to produce the desired column result (314). This approach can be extended to higher dimensional matrices for highly effectively multi-processor computing.

FIGS. 4A-4D are diagrams illustrating information organized in two dimensional arrays. In these figures, characteristics of the data are illustrated as squares with different shading. For simplicity, only two different characteristics of the data are shown, with one characteristic shown as an unshaded square and a second characteristic shown as a shaded square.

Figure 4A:
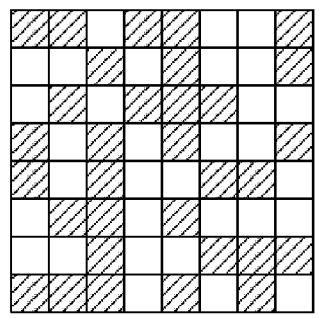
FIG. 4A-D are diagrams illustrating information organized in two dimensional matrices, according to one example of principles described herein.
Figure 4B:
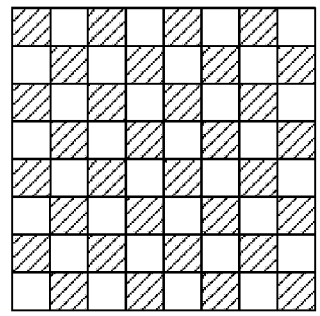
Figure 4C:
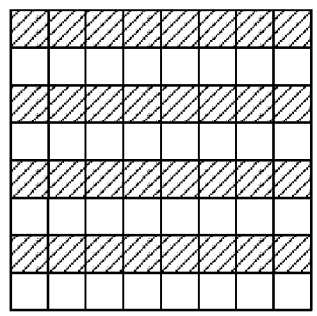

In FIGS. 4A-4C, the data is not organized in columns according to the natural parallelism of associative operations which will be performed on the data. FIG. 4A shows data with differing characteristics randomly distributed throughout the matrix 401. FIG. 4B shows data with different characteristics distributed in alternating locations and FIG. 4C shows the data organized in rows rather than columns. A preliminary step in efficiently combining data values using multiple processors may include arranging a raw data matrix (401, 402, 403) into a data matrix with columns organized according to the natural parallelism of the data (404) and associative operations which will be performed on the data. As described above, this natural parallelism (404) is a characteristic of the data and associative operations which will be executed on the data. For example, in a data set tracking company expenses, the natural parallelism (404) of the data may include one column dedicated to travel expenses, while another column may be dedicated to office expenses etc. A sum operation may be performed on both columns to determine the total expenses for each category.

Figure 4D:
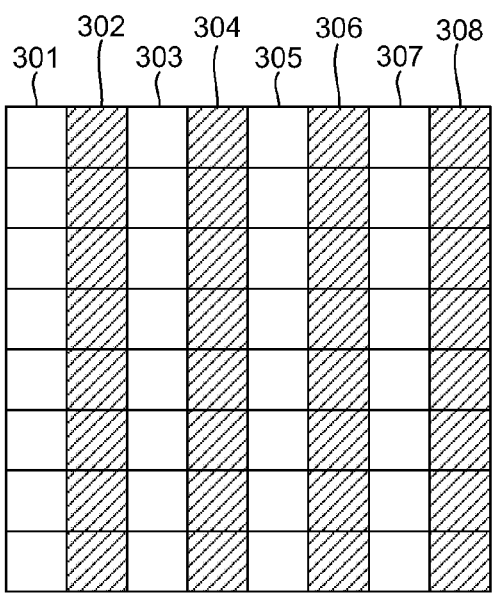

The data is organized into any number of data columns (301, 302, 303, 304, 305, 306, 307, 308) according to natural parallelism within the data and the associative operations which will be performed on the data. These columns may be juxtaposed next to one another to form a two dimensional matrix (404). While FIG. 4D depicts eight columns of data values, any number of columns may be juxtaposed to form a two or three dimensional matrix.

With the natural parallelism of the associative operations is taken into consideration when organizing the data subsets, the algorithm that processes the data can store the data in a few coalesced memory locations. As defined above, the coalesced memory access refers to access by a group of processors to adjacent memory addresses. In FIG. 4D, if each of the eight processors process one of the columns, the memory access is coalesced. Coalesced memory access is advantageous as it improves the memory bandwidth utilization, which reduces the processing time to write, read and sync between the processors, and between the processors and the memory. Thus processing time is reduced and output is returned more quickly. Coalesced memory access can be generalized in a mathematical expression as follows: Let $T_1, T_2, \ldots, T_n$ be n tasks working on the data sets $D_1, D_2, \ldots, D_n$. Let P by the program run by all the tasks on their own data. Assuming that the fine-grained data granules in $D_j$ are accessed in the following sequence, $D_j = \{d_{j,1}, d_{j,2}, d_{j,3}, \ldots, d_{j,k}\}$, $j=1, \ldots n$. By arranging the subsets of data of $D_1, D_2, \ldots, D_n$ in the following fashion, coalesced memory access is facilitated which increases the memory bandwidth utilization: $D_j = \{d_{j,1}, d_{j,2}, d_{j,3}, \ldots, d_{j,k}, d_{2,k}, \ldots, d_{n,k}\}$.

Figure 5:
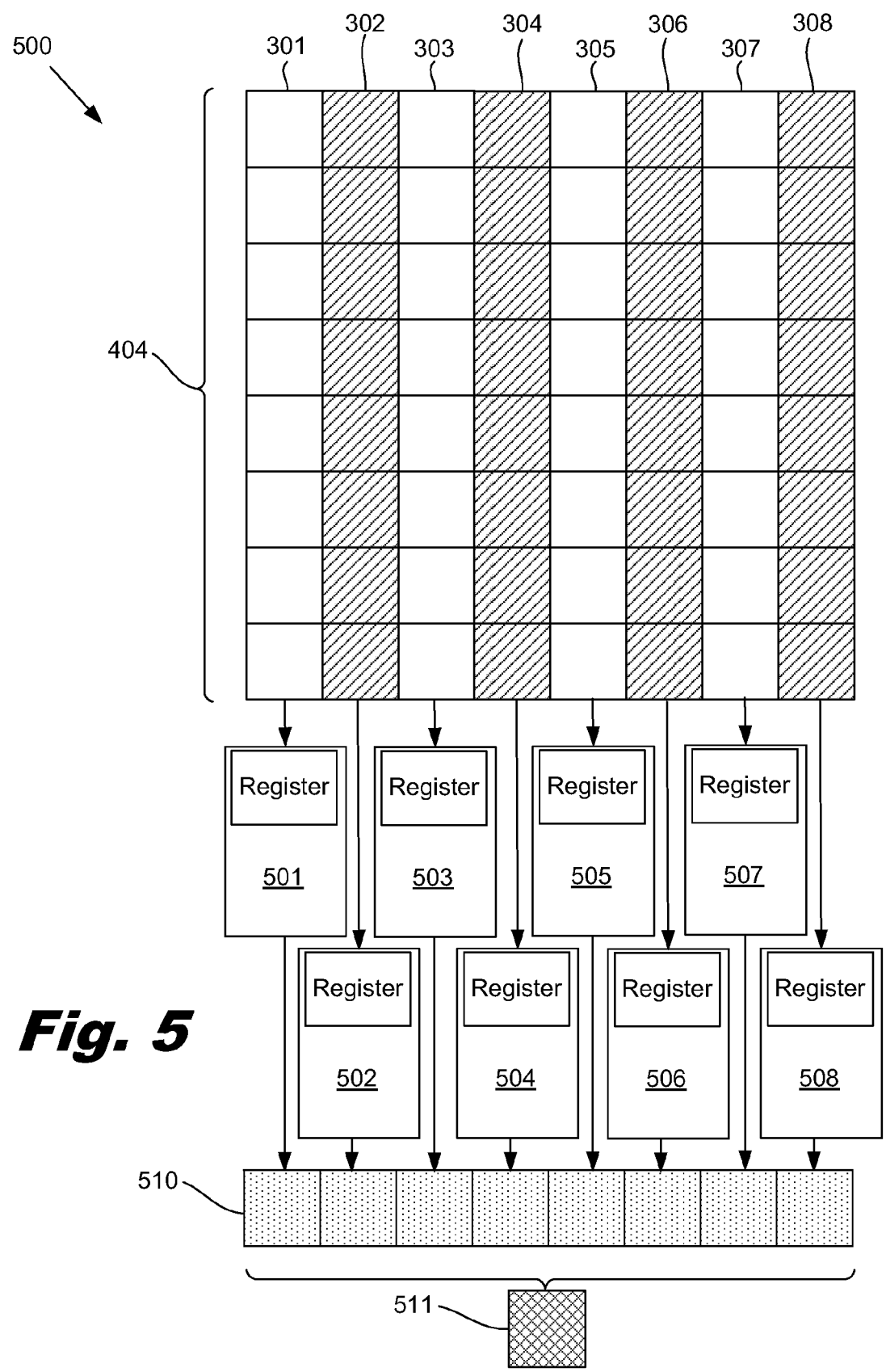
FIG. 5 is a diagram showing an illustrative system for combining data values through an associative operation, according to one example of principles described herein.

FIG. 5 is a diagram showing an illustrative system (500) which accepts a data matrix (404) organized according to natural parallelism and operates on the data values to produce a desired result. In this example, the data matrix (404) is a two dimensional matrix. As discussed above, the data values in this data matrix are organized in columns. Data within each column has at least one significant similarity and similar operations are performed on each column.

The system (500) may also include any number of processors (501, 502, 503, 504, 505, 506, 507, 508). These processors may be assigned to the individual columns (301, 302, 303, 304, 305, 306, 307, 308) of data within the data matrix (404). As discussed above in FIG. 3, this is advantageous as assigning an individual processor to a distinct column of the data matrix (509), allows each processor to be utilized for the full duration of a prescribed process. As a result, processing time is reduced as an increased utility of the multiple processors may be achieved. With each processor (501, 502, 503, 504, 505, 506, 507, 508) working individually on a particular column of the data matrix (404), there is no synchronization between the multiple processors. The reduction of synchronization further reduces the processing time of the process.

The system (500) may also include a results array (510), which includes a final value produced from each column (301, 302, 303, 304, 305, 306, 307, 308) in the data matrix (404). The system (500) may also include a final matrix result (511) which represents the result of another operation combining the values in the results array (510).

While FIG. 5 depicts eight processors (501, 502, 503, 504, 505, 506, 507, 508), the system (500) may include any number of processors. The system (500) may also include executable code that causes the processors (501, 502, 503, 504, 505, 506, 507, 508) to combine the data values in their respective columns using an associative operation. Another example of the system (500) may include executable code that combines the data values using a prefix scan. Yet another example of the system (500) may include combining the data values using parallel reduction. The matrix (404) illustrated here is only an example. A variety other matrices and data organizations could be used. For example, the matrix size and dimensionality could vary over a wide range.

The system (500) may also include registers that are located on the individual processors (501, 502, 503, 504, 505, 506, 507, 508). These registers, as defined above, are locations on the processors (501, 502, 503, 504, 505, 506, 507, 508) which temporarily store intermediate data values of the associative operation performed by each processor. Temporarily storing the intermediate results on the registers is advantageous because it avoids writing intermediate results to the memory of the computing device. As well, it avoids requiring the processors to continually read intermediate results from the memory. Since memory access is avoided in these steps, there is no need to synchronize between the processors and the memory, therefore processing time is further improved. As these writing, reading, and synchronizing steps take up valuable processing time, their elimination reduces processing time. Further, all of the assigned processors are active throughout the process of producing the column results. This effectively utilizes the available processing capability.

Figure 6:
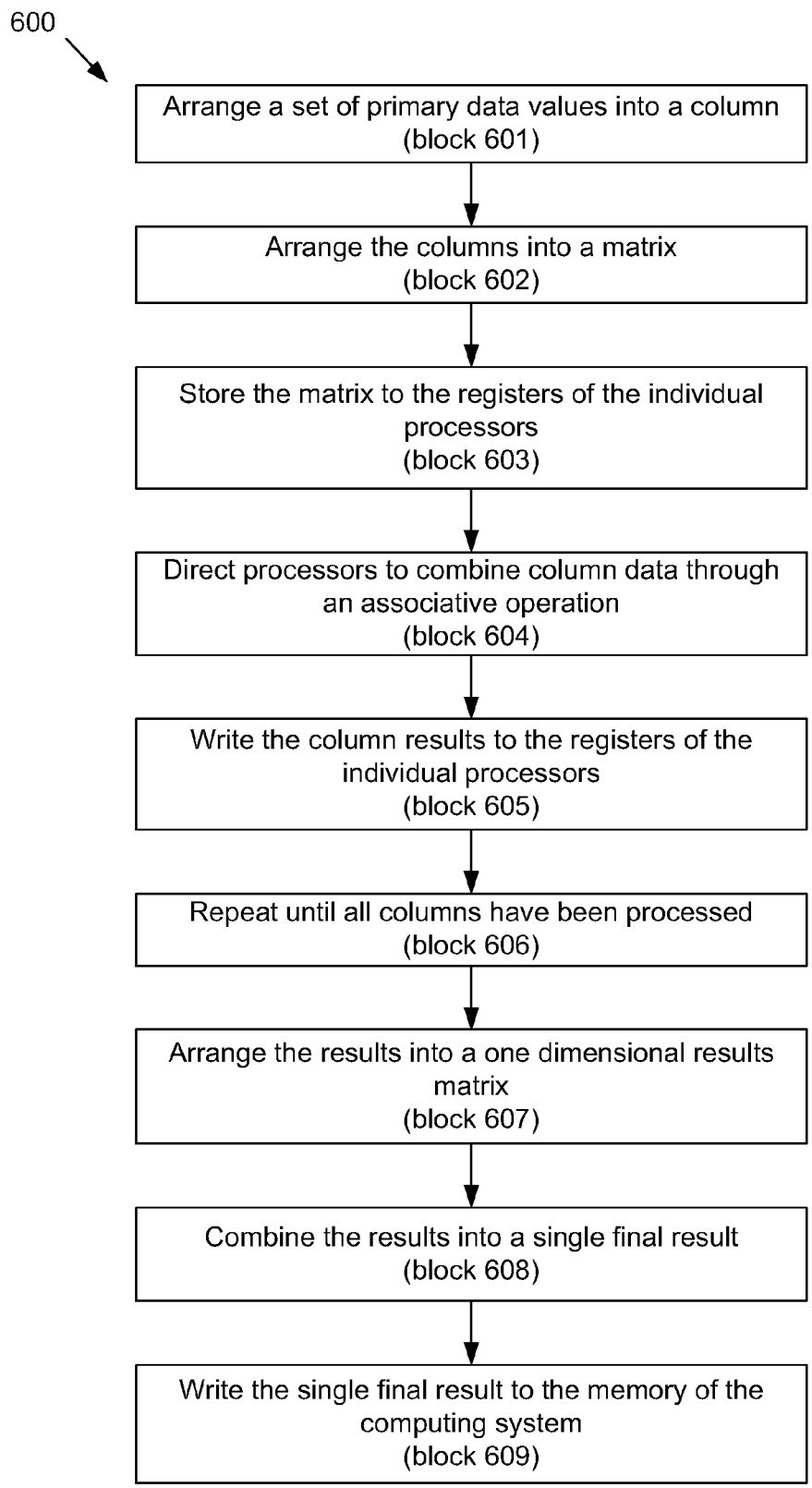
FIG. 6 is a flowchart showing an illustrative method for combining data values through an associative operation, according to one example of principles described herein.

FIG. 6 is a flowchart showing an illustrative method (600) for combining data values through an associative operation. The method (600) may include arranging a set of primary data values into any number of data columns (block 601) according to the natural parallelism of the data and the associative operations which will be performed on the data. This allows an algorithm to be constructed which will utilize the natural parallelism to enhance the coalesced memory access. As described above, the coalesced memory access improves the memory bandwidth utilization which results in a reduced processing time. Because certain applications store data in rows, one example of arranging the primary data values into columns may include transposing the data from rows to columns. Then, the method (600) may include arranging the data columns into a two or three dimensional data matrix (block 602). The columns of this data matrix may then be stored to the registers of the individual processors (block 603). Storing the columns in the registers avoids the time consuming processes of synchronization, reading, and writing. Reading distinct columns to individual processors is advantageous because all processors are utilized for the whole prescribed process as the processors are working independently from one another and require no synchronization with other processors. This accelerates the completion of the predetermined process.

The processors then perform an associative operation which combines the column data (block 604) to produce a column result. The column results are written to the register of the individual processors (block 605).

There may be cases where the number of data columns exceeds the number of available processors. Under this circumstance, the method may include repeating the storing (block 603), combining (block 604), and writing (block 605) steps in an iterative fashion until all data columns have been processed by a processor (block 606). However, because a particular processor is combining an entire column by itself, the particular processor need not wait for other processors to finish processing a different column before moving on to an unprocessed column. This further maximizes the processing power of each individual processor and as a result decreases processing time.

At this point in the method (600), each column of the data matrix has a corresponding column result. One example of the method (600) may then include arranging each of the column results in a results column (block 607) and combining the results column into a single final result (block 608). This combining step may be performed in a variety of ways, including through an associative operation (as described in FIG. 3), a prefix scan (as described in Eq. 1) or parallel reduction (as described in FIG. 2, 200). An example of a computer algorithm to accomplish combining data values through an associative operation may be illustrated as follows:

--- for r = 0 to rows in parallel do
t += $x_{r,t}$

---

An example of a computer algorithm to produce a final result using multiple parallel reduction is described as follows:

--- for c = 0 to columns − 1 do
parallel_reduction $x_c$

---

Once a single final result has been established the method may then include writing the single final result to the memory of the computing system (block 609).

Figure 7:
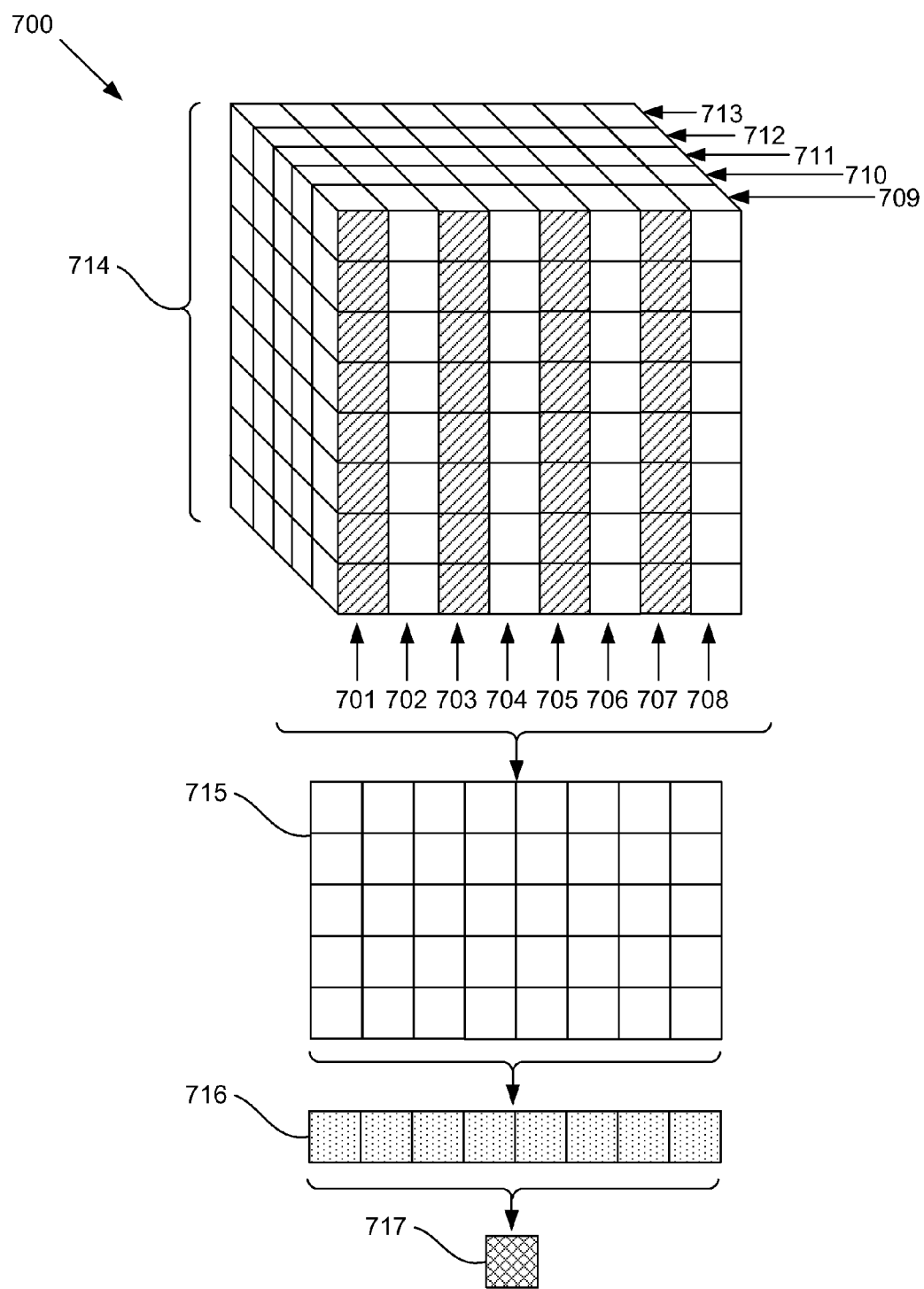
FIG. 7 is a diagram showing another illustrative system for combining data values through an associative operation, according to one example of principles described herein.

The systems and principles described above can be extended to include higher dimensional matrices. FIG. 7 is a diagram showing another illustrative system (700) for combining data values through associative operations on a three dimensional matrix. The system (700) may include any number of columns of data values (701, 702, 703, 704, 705, 706, 707, 708). These columns may be juxtaposed next to one another to form a two dimensional data matrix (709). Any number of these two dimensional data matrices (709, 710, 711, 712, 713) may be juxtaposed next to one another to form a three dimensional data matrix (714). While FIG. 7 depicts eight columns (701-708) and five two dimensional data matrices (709-713), any number of columns and two dimensional matrices may be juxtaposed to form a three dimensional matrix.

The system (700) includes a two dimensional results matrix (715) which represents the results of the processors combination of the data values of each column (701, 702, 703, 704, 705, 706, 707, 708) of each two dimensional matrix (709, 710, 711, 712, 713). The system (700) may also include a one dimensional results matrix (716) which represents the results of the processors combination of the data values in each column of the two dimensional results matrix (715). The system (700) may further include a final result (717) which represents the result of a processor's combination of the data values in the one dimensional results matrix (716).

Figure 8:
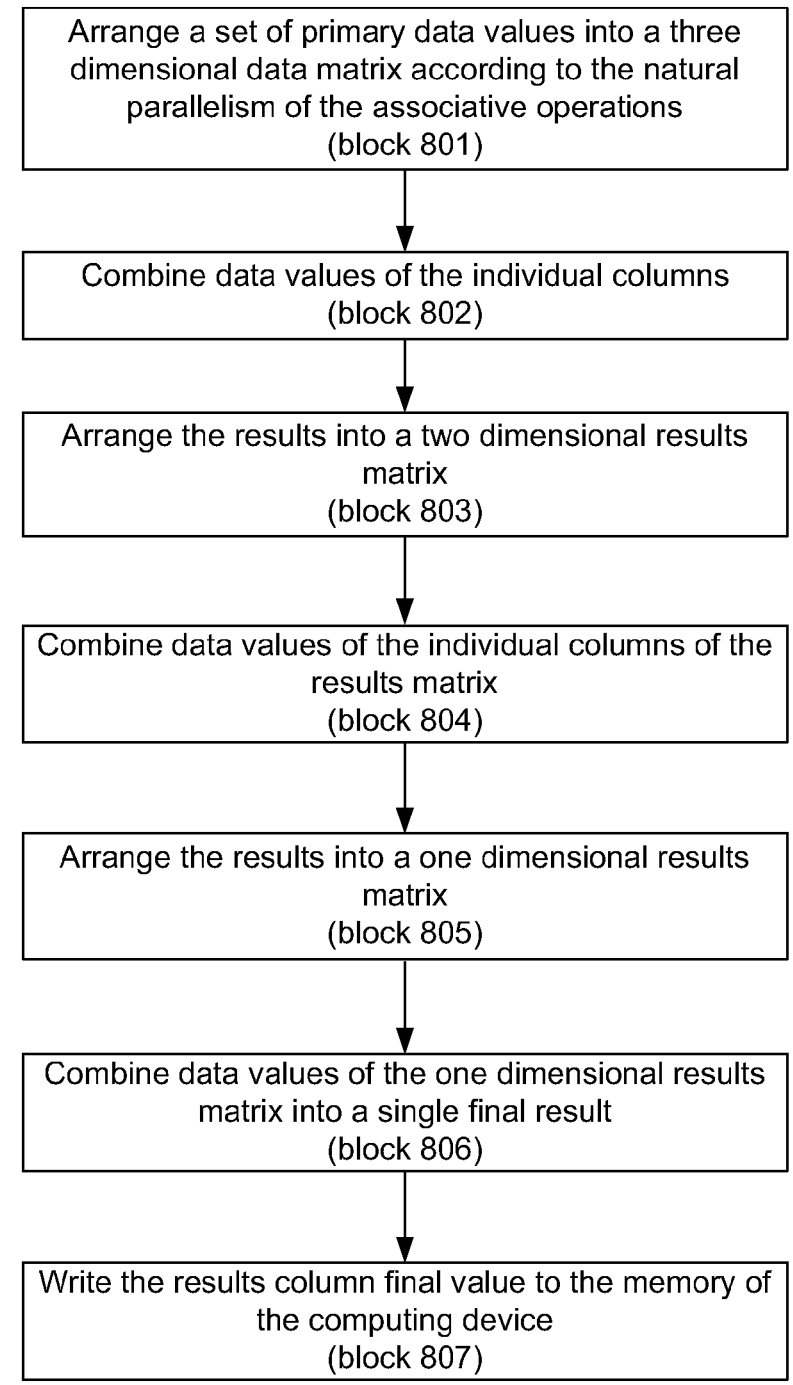
FIG. 8 is a flowchart showing an illustrative method for combining data values through an associative operation, according to one example of principles described herein.

FIG. 8 is a flowchart showing another illustrative method (800) for combining data values through an associative operation as shown in FIG. 7. Many times a data set will include a three dimensional data matrix (714, FIG. 7). Analyzing a three dimensional data matrix (714, FIG. 7) is similar to analyzing the data values in a data column.

The method (800) may include arranging a set of primary data values into a three dimensional matrix with columns organized according to the natural parallelism of the associative operations (block 801). The data values in each column are combined by a single processor according to an associative operation (block 802).

After all columns have been processed, a single final value will exist for each column. Once a single final value for each column has been obtained, the method (800) may then include arranging the final values into a two dimensional results matrix (block 803). The method (800) may then include combining the columns of the results matrix into a one dimensional results matrix (block 804) such as the one dimensional matrix (716) shown in FIG. 7. Different examples of the combining step may include combining through an associative operation, a prefix scan, or parallel reduction as described above.

The method (800) may then include arranging the results into a one dimensional results matrix (block 805) and combining the data values into a single final result (block 806). Different examples of the combining data values may include combinations formed through an associative operation, a prefix scan, or parallel reduction.

Once a single final value for the results column has been obtained, the method (800) may include writing this single final value to the memory of the computing device (block 807).

The preceding description has illustrated a method for combining data values using associative operations. This method may organize data into any number of columns according to its natural parallelism and then assign an individual processor to combine the data values into a column result. These column results are temporarily stored in a register of the processor until all column results have been processed. At this point, the column results are combined and returned to the memory of the computing device. This method is advantageous because it takes advantage of the natural parallelism to increase the data transfer. The method utilizes the registers of the processors to reduce the processing time to read, write, and synchronize the processors and the memory of the computing device. Thus valuable processing time is more efficiently allocated to processing data. Further, all of the assigned processors are active throughout the process of producing the column results. This effectively utilizes the available processing capability.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method for combining data values through associative operations, the method comprising:
   arranging data values into a plurality of columns according to natural parallelism of the associative operations to form a first data matrix;
   reading each column to a register of a respective one of a number of processors;
   directing each of the processors to execute a respective first one of the associative operations, in parallel, on the data values in their respective columns to which the processors are assigned;
   storing the respective results of the first associative operation for each respective column to a respective register of each processor;
   arranging the plurality of columns into a plurality of two dimensional matrices; and
   arranging the two dimensional matrices into a three dimensional matrix.

2. The method of claim 1, in which arranging data values into a plurality of columns comprises transposing rows in a second data matrix into columns in the data matrix.

3. The method of claim 1, further comprising storing the results of the respective first associative operation to the memory of the computing device.

4. The method of claim 1, further comprising:
   arranging the results of the first associative operation into a number of primary results columns;
   reading the data values in each of the individual primary results columns into registers of one of the plurality of processors; and
   directing each of the processors to combine the data values in the primary results column to produce a primary final result in parallel.

5. The method of claim 4, further comprising arranging the primary results columns into a two dimensional results matrix.

6. A method for combining data values through associative operations, the method comprising:
   arranging data values into a plurality of columns according to natural parallelism of the associative operations to form a first data matrix;
   reading each column to a register of a respective one of a number of processors;
   directing each of the processors to execute a respective first one of the associative operations, in parallel, on the data values in their respective columns to which the processors are assigned;
   storing the respective results of the first associative operation for each respective column to a respective register of each processor;
   in which the number of columns is greater than the number of processors, the method further comprising:
   associating the results of the first associative operation with corresponding columns;
   identifying unprocessed columns which are not associated with a result;
   assigning one processor to each unprocessed column; and
   directing the processors to combine the data values in the unprocessed columns through the first associative operation.

7. A method for combining data values through associative operations, the method comprising:
   arranging data values into a plurality of columns according to natural parallelism of the associative operations to form a first data matrix;
   reading each column to a register of a respective one of a number of processors;
   directing each of the processors to execute a respective first one of the associative operations, in parallel, on the data values in their respective columns to which the processors are assigned;
   storing the respective results of the first associative operation for each respective column to a respective register of each processor;
   arranging the results of the first associative operation into a number of primary results columns;
   reading the data values in each of the individual primary results columns into registers of one of the plurality of processors;
   directing each of the processors to combine the data values in the primary results column to produce a primary final result in parallel;
   arranging the primary results columns into a two dimensional results matrix;
   wherein the number of columns in the two dimensional results matrix is greater than the number of processors, the method further comprising:
   assigning a processor to each unprocessed column; and
   directing the assigned processor to combine data values in the unprocessed column to produce a secondary result.

8. The method of claim 7, further comprising combining secondary results from the columns of the two dimensional results matrix by performing the respective first associative operation.

9. The method of claim 7, further comprising combining secondary results from the columns of the two dimensional results matrix by performing a prefix scan.

10. The method of claim 7, further comprising combining secondary results from the columns of the two dimensional results matrix by performing a parallel reduction.

11. A method for combining data values through associative operations, the method comprising:

arranging data into a data matrix, having a number of columns, according to natural parallelism of the associative operations, the data matrix being stored in a memory device;

assigning each of a plurality of processors to a subset of the data stored in a contiguous memory location;

directing the plurality of processors to execute a number of respective associative operations on data values in the subsets to produce intermediate results;

writing the intermediate respective results to registers in the processors; and producing a final result from the intermediate results, the final result being stored in a memory of a computing device;

in which the number of columns is greater than a number of the processors, the method further comprising:

associating the intermediate results with corresponding columns;

identifying unprocessed columns which are not associated with an intermediate result;

assigning one processor to each unprocessed column; and directing the processors to combine data values in the unprocessed columns through the number of associative operations.

12. The method of claim 11, in which the subset of data stored in a contiguous memory location is a column within the data matrix.

13. The method of claim 11, in which the associative operations are performed on data values in the column without writing to memory, reading from memory, or synchronization to produce the intermediate results.

14. The method of claim 11, in which the subset of data stored in a contiguous memory location is written to a register of the assigned processor.

15. The method of claim 11, in which the data matrix is a two dimensional matrix.

16. The method of claim 11, in which the data matrix is a three dimensional matrix.

17. The method of claim 16, in which the intermediate results comprise a two dimensional matrix.

18. The method of claim 17, in which the final result is a one dimensional matrix.

19. The method of claim 16, in which a number of columns in one of the data matrix or the intermediate results is greater than the number of processors, the method further comprising:

assigning a processor to each unprocessed column; and directing the assigned processor to combine data values in the unprocessed column according to the associative operations.

* * * * *